US009014472B2

(12) United States Patent
Lin et al.

(10) Patent No.: US 9,014,472 B2
(45) Date of Patent: Apr. 21, 2015

(54) COLOR BALANCED COMPRESSION IN DYNAMIC RANGE MISMATCHED COLOR SYSTEMS

(71) Applicant: Xerox Corporation, Norwalk, CT (US)

(72) Inventors: Guo-Yau Lin, Fairport, NY (US); James Michael Sanchez, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 146 days.

(21) Appl. No.: 13/837,682

(22) Filed: Mar. 15, 2013

(65) Prior Publication Data
US 2014/0270510 A1 Sep. 18, 2014

(51) Int. Cl.
G06K 9/00 (2006.01)
G06T 11/00 (2006.01)

(52) U.S. Cl.
CPC .................. G06T 11/001 (2013.01)

(58) Field of Classification Search
None
See application file for complete search history.

(56) References Cited

U.S. PATENT DOCUMENTS

| 5,699,491 A | 12/1997 | Barzel | |
|---|---|---|---|
| 5,907,415 A * | 5/1999 | Yabe | 358/518 |
| 6,266,152 B1 * | 7/2001 | Nakajima | 358/1.9 |
| 7,019,755 B2 | 3/2006 | Krueger et al. | |
| 7,554,705 B2 | 6/2009 | Edge | |
| 7,580,566 B2 * | 8/2009 | Fukuda et al. | 382/168 |
| 7,880,942 B1 * | 2/2011 | Phillips et al. | 358/518 |
| 8,270,029 B2 | 9/2012 | Gil et al. | |
| 8,290,260 B2 | 10/2012 | Farrell et al. | |
| 2007/0188780 A1 | 8/2007 | Edge | |
| 2009/0296152 A1 * | 12/2009 | Mestha et al. | 358/2.1 |
| 2010/0253954 A1 * | 10/2010 | Bonnier et al. | 358/1.9 |
| 2010/0290797 A1 * | 11/2010 | Mestha et al. | 399/38 |
| 2011/0019212 A1 | 1/2011 | Wang et al. | |
| 2012/0038938 A1 | 2/2012 | Oh et al. | |
| 2014/0126002 A1 * | 5/2014 | Gil et al. | 358/1.9 |
| 2014/0126003 A1 * | 5/2014 | Maltz et al. | 358/1.9 |

* cited by examiner

Primary Examiner — Li Liu
(74) Attorney, Agent, or Firm — Kermit D. Lopez; Luis M. Ortiz; Ortiz & Lopez, PLLC

(57) ABSTRACT

Methods, systems and processor-readable media for color balanced compression in dynamic range mismatched color environments. An input $L^*$ can be compensated based on $L^*_{min}$ in a destination space with respect to shadow colors while configuring a perceptual LUT during a profile phase. Input opponent color components $a^*$ and $b^*$ can be compressed based on how much $L^*$ is compensated to generate newly compressed $L^*a^*b^*$ values. The newly compressed $L^*a^*b^*$ values can be treated as an output $L^*a^*b^*$ to configure the perceptual LUT for color balanced compression thereof. Finally, an operation can be performed for recording in the output LUT, optimized CMYK values with respect to the output $L^*a^*b^*$ to configure the perceptual LUT in an ICC profile and result in the color balanced compression thereof.

20 Claims, 6 Drawing Sheets

COLOR BALANCED COMPRESSION IN DYNAMIC RANGE MISMATCHED COLOR SYSTEMS

FIELD OF THE INVENTION

Embodiments are generally related to image processing, rendering devices, and color management systems.

BACKGROUND

Image-rendering devices such as, for example, monitors, scanners, and printers often impose distortions on the color characteristics of a rendered image. Hence, matching of color appearance between images and documents transferred among any combination of the digital image rendering devices requires the use of specialized color image processing knowledge regarding the color rendering characteristics associated with different imaging devices. A CMS (Color Management System) is necessary because different imaging devices have different color capabilities, describe color characteristics in varying terms, and operate among variable color spaces. Such systems generally depend upon standard data structures known as color profiles to determine how to process image pixels.

Photo-product production in retail environments is a significant business opportunity; however, such an environment is very cost sensitive and places a premium on ease-of-use for low-skilled operators. Maximizing the apparent color gamut is very important when producing image centric custom photo-products where end users generally compare the results to silver halide prints. ICC (International Color Consortium) profiles are a professional color management solution and follow an international and accepted standard to enable accurate printed color for all colors that the rendering devices can reproduce. In contrast, achieving accurate color via manual tweaking is nearly impossible due to the complex nature of the rendering device color response. ICC profiles offer the ability to manage color properly to ensure accurate output on various devices. Custom ICC printer profiles can dramatically improve the apparent color gamut of color rendering devices as compared to fleet profiles.

In a CMS and related components and devices, when the dynamic range in the destination space is smaller than that in the source space, use of the relative colorimetric rendering intent will cause dipping in the gamut mismatched area. Although in this case, use of perceptual rendering intent will generally produce better results due to the compression around the gamut boundary, it still causes loss of shadow detail due to the fact that multiple colors in the shadow area will be compressed to the similar color. Use of black point compensation (BPC) can recover some shadow detail by compensating for the $L^*_{min}$ in the destination space and moving the mapped L* to a lighter point depending on the pre-mapped L* value. However, BPC sometimes produces overly saturated appearance in the compensated image content due to current approach of preservation of a* and b*. (By this it is meant a* and b* maintain initial values while L* is compressed upward resulting a higher L* value).

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improvement image-processing methods, systems and processor-readable media.

It is another aspect of the disclosed embodiments to provide for methods, systems and processor-readable media for color balanced compression.

The aforementioned aspects and other objectives and advantages can now be achieved as described herein. A method and system for color balanced compression in dynamic range mismatched color environments are disclosed herein. In general, the input L* can be compensated based on $L^*_{min}$ in a destination space with respect to shadow colors while configuring a perceptual LUT during a profiling phase. The input opponent color components a* and b* can be compressed based on how much L* is compensated to generate newly compressed L*a*b* values. The newly compressed L*a*b* values can be treated as an output L*a*b* to configure the perceptual LUT for color balanced compression thereof. Finally, an operation can be performed for recording in the output LUT, optimized CMYK values with respect to the output L*a*b* to configure the perceptual LUT in an ICC profile and result in the color balanced compression thereof.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The disclosed embodiments generally include the following: in building a perceptual LUT (Look Up Table) during profiling, for the shadow colors, input $L^*$ is compensated based on the $L^*_{min}$ in the destination space.

$$L^* = T(L^*_{orig}) \quad (1)$$

Figure 1:
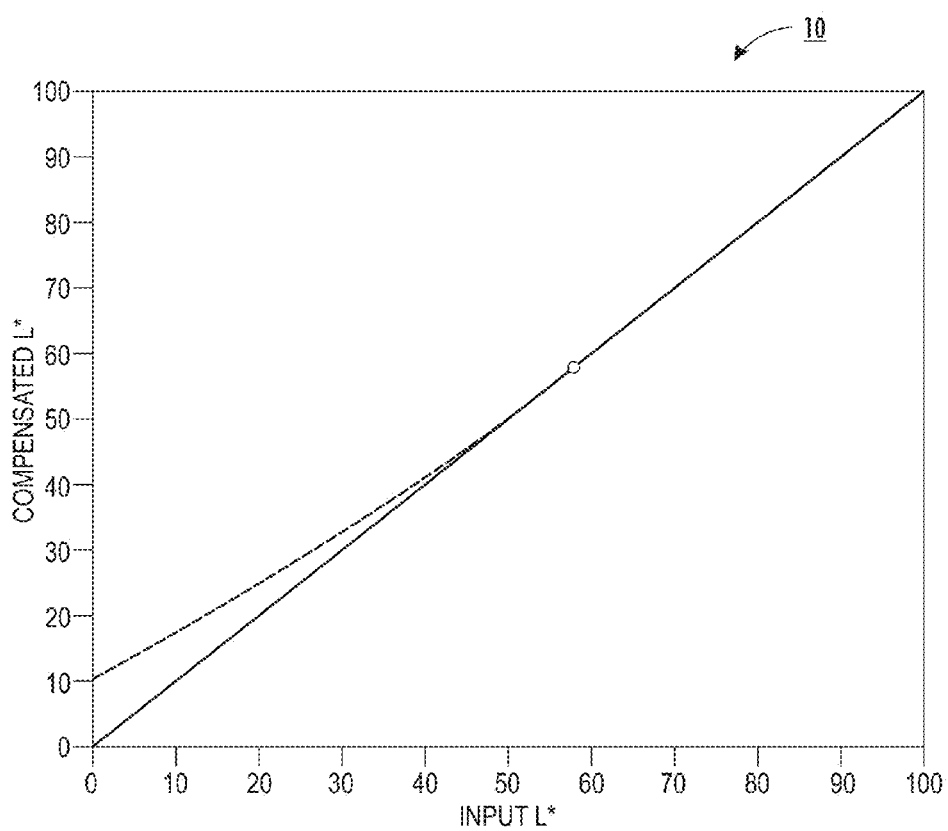
FIG. 1 illustrates a graph 10 depicting a prior L* compensation curve utilizing a generic transfer function T( )

FIG. 1 illustrates a graph 10 depicting a typical $L^*$ compensation curve utilizing a generic transfer function $T(\ )$. In the example depicted in graph 10, the printer $L_{min}$ is about 10 $L^*$. The compensation transfer function $T(\ )$ moves the lowest input to printer $L_{min}$ and adjusts the curve smoothly. The compensation stops around $L^*=60$, meaning if the input $L^*$ is greater than 60, there would be no compensation for the input.

In general, there are several parameters that one can use to create the curve depicted in FIG. 1. For example, the slope at input $L^*=0$ and the interception point where the compensated and uncompensated curves meet, etc. Since this approach lightens $L^*$ while leaving $a^*$ and $b^*$ unmodified, it produces less saturated results depending on the $L^*_{min}$:

$$S_{ab} = C^*_{ab}/L^* = (a^{*2} + b^{*2})^{1/2}/L^* \quad (2)$$

or the following when human perception is taken into account:

$$S_{ab} = C^*_{ab}/(C^{*2}_{ab} + L^{*2})^{1/2} \quad (3)$$

However, when compared with the overall image, since the $L_{min}$ has substantially increased, the modified color appears to have a more colorful appearance in the image. For example, the overall color balance becomes warmer as shown in the upper-left image of FIG. 4. This can be seen in the skin color where the mapped skin tone becomes more orange or warmer in appearance and tone.

Since leaving $a^*$ and $b^*$ unmodified renders a perception of more colorful appearance, and a too warm appearance in Caucasian skin tones when $L_{min}$ is lightened, we propose to compress $a^*$ and $b^*$ when $L^*$ is compensated for the $L_{min}$. The following equations show the compression of $a^*$ and $b^*$ based on the compensated and the original $L^*$:

$$a^* = g(L^*, L^*_{orig}) \cdot a^*_{orig} \quad (4)$$

$$b^* = g(L^*, L^*_{orig}) \cdot b^*_{orig} \quad (5)$$

where $$g(L^*, L^*_{orig}) = (1 - c \cdot ((L^* - L^*_{orig})/L^*)^{\gamma_1})^{\gamma_2} \quad (6)$$

Coefficients $c$, $\gamma_1$, and $\gamma_2$ can be hue dependent, or simply a constant. When these coefficients are hue dependent, we can have a control over how much we want to compress chroma based on the hue angle. $a^*$ and $b^*$ are compressed with the same factor to preserve the hue.

Note that when $c=0$, no $a^*b^*$ compression will be performed; when $c=1$, full $a^*b^*$ compression will be applied.

Also note that the compression function $g(\ )$ is based on the difference between the pre- and post-compensated $L^*$ values. If there is no compensation for $L^*$, i.e., $L^* - L^*_{orig} = 0$, there is no compression for $a^*$ and $b^*$, i.e. $g(\ )=1$. By doing this, the smoothness for the boundary colors is guaranteed.

Figure 2:
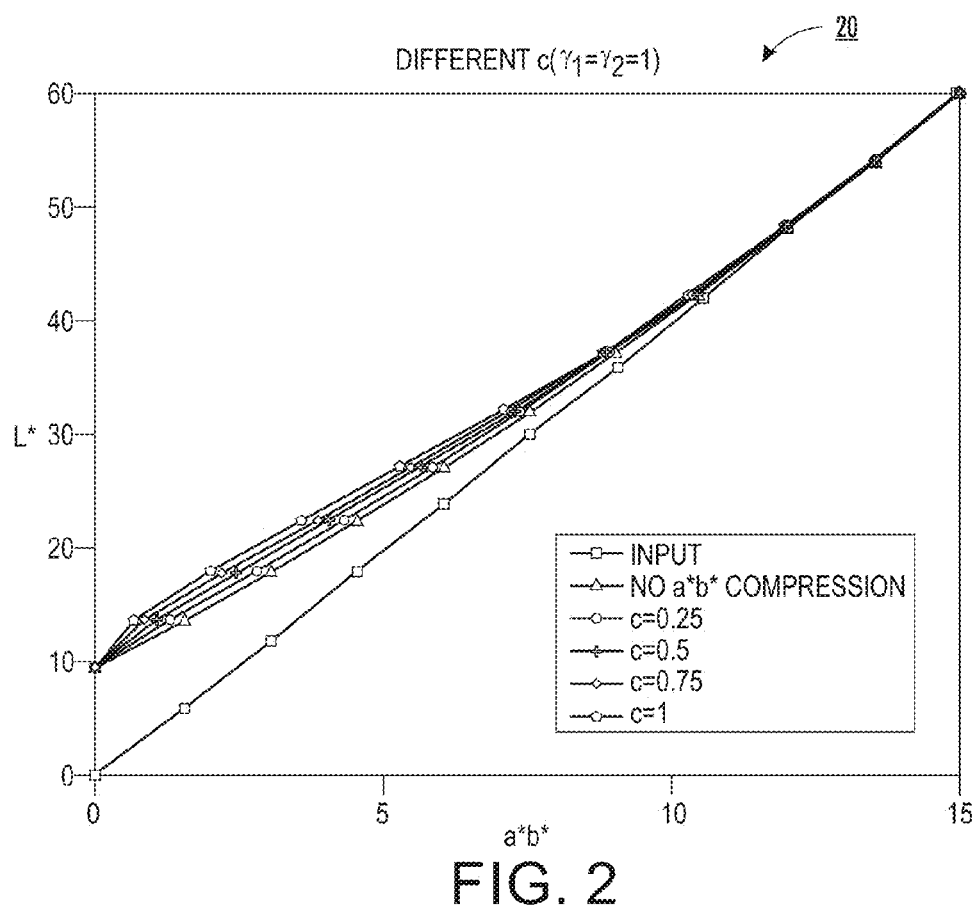
FIGS. 2-3 illustrate graphs, which demonstrate how the coefficient c affects the compression result, wherein $\gamma_1$ and $\gamma_2$ are both 1 in these example graphs.
Figure 3:
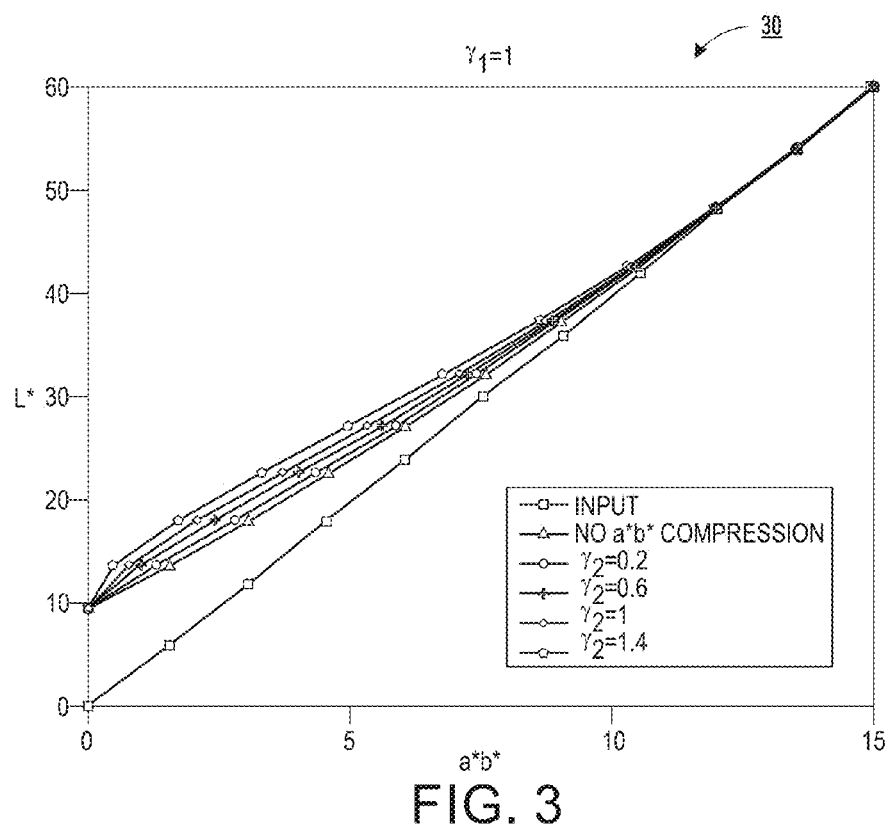

FIGS. 2-3 illustrate graphs 20 and 30, which demonstrate how the coefficient c affects the compression result, wherein $\gamma_1$ and $\gamma_2$ are both 1 in these example graphs. The input is a sweep from $L^*a^*b^*=(0,0,0)$ to $(60,15,20)$, a typical skin tone. The x axis represents $a^*$. Although $b^*$ (from 0 to 20) is not shown, it has the same curves if one normalizes the input domain. Graphs 20 and 30 thus demonstrate the effect of using different c, $\gamma_1$, and $\gamma_2$ values.

FIG. 3 generally illustrates the same plots as in FIG. 2, but with different $\gamma_1$ and $\gamma_2$, while holding c=1.

Figure 4:
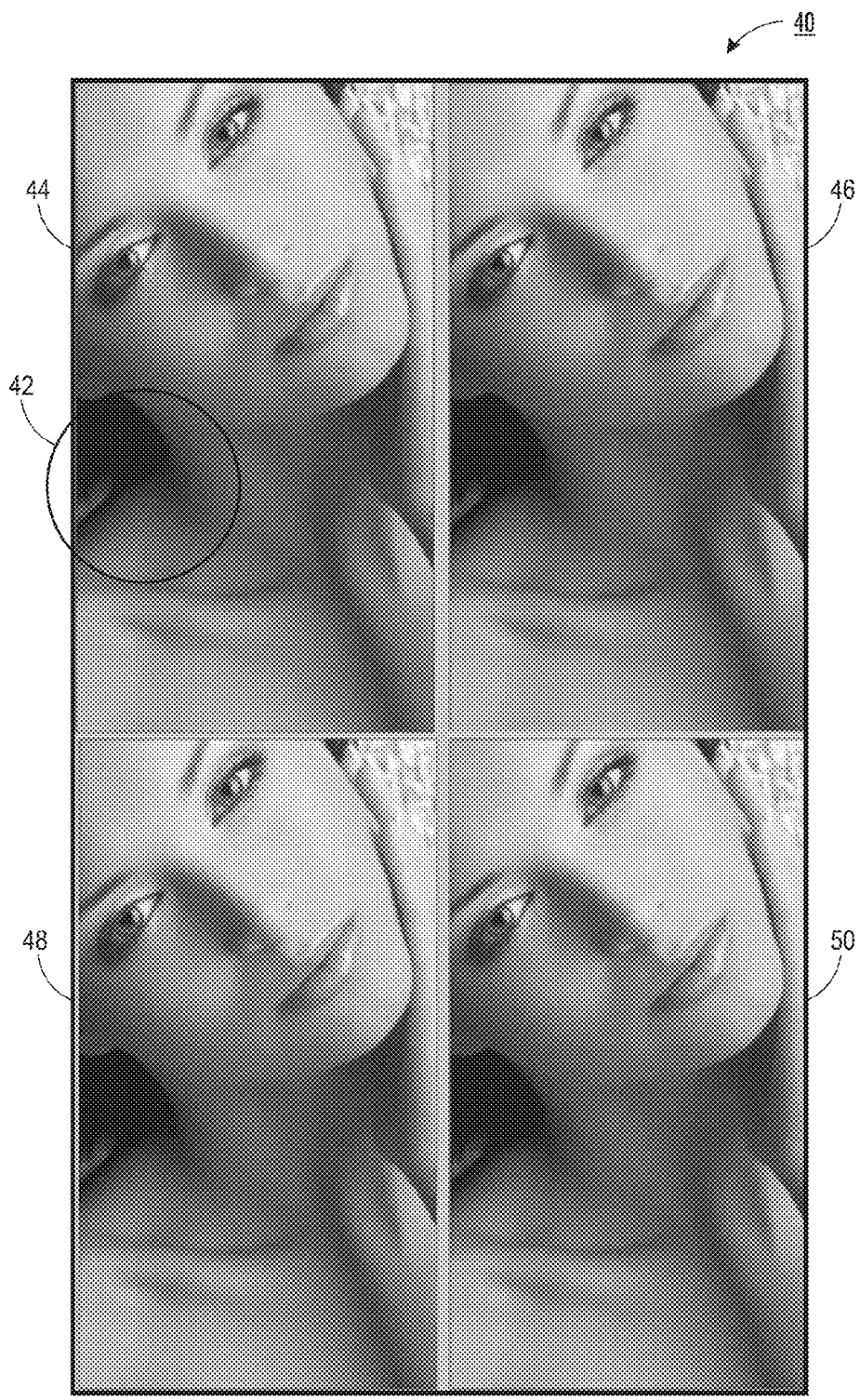
FIG. 4 illustrates images, which demonstrate the effect of using the disclosed method, in accordance with the disclosed embodiments.

FIG. 4 illustrates images 44, 46, 48 and 50, which demonstrate the effect of using the disclosed method, in accordance with the disclosed embodiments. Such images are meant to be either soft proofed or reviewed on the actual prints. The respective lower left and upper left images 48 and 44 are original RGB image and mapped CMYK image (in perceptual rendering intent) with the common BPC algorithm, respectively. Although these images recover some shadow details, the BPC algorithm create some severe contouring (see circle 42), and also renders the overall perceived color balance warmer. The images 46 and 50 on the right are the results of utilizing the disclosed approach (e.g., see the method 60 of FIG. 5). One can see that the contouring is greatly reduced in the images 46 and 50 on the right. Overall, the color balance (especially the neck/shoulder area) is better preserved utilizing the disclosed method and/or system.

Note that the equations (4) and (5) can operate on a printer where the $L_{min}$ occurs at neutral. When the bottom of the gamut is not neutral, i.e. $a^* \neq 0$ or $b^* \neq 0$, one can calculate Equations (4) and (5) relative to ($L^*_{min}$, $a^*_{bottom}$, $b^*_{bottom}$) to prevent over compression as follows:

$$a^* = a^*_{bottom} + g(L^*, L^*_{orig}) \cdot (a^*_{orig} - a^*_{bottom}) \quad (7)$$

$$b^* = b^*_{bottom} + g(L^*, L^*_{orig}) \cdot (b^*_{orig} - b^*_{bottom}) \quad (8)$$

Note that equations (7) and (8) do not preserve $a^*/b^*$ ratio. Thus, the hue is not preserved.

Figure 5:
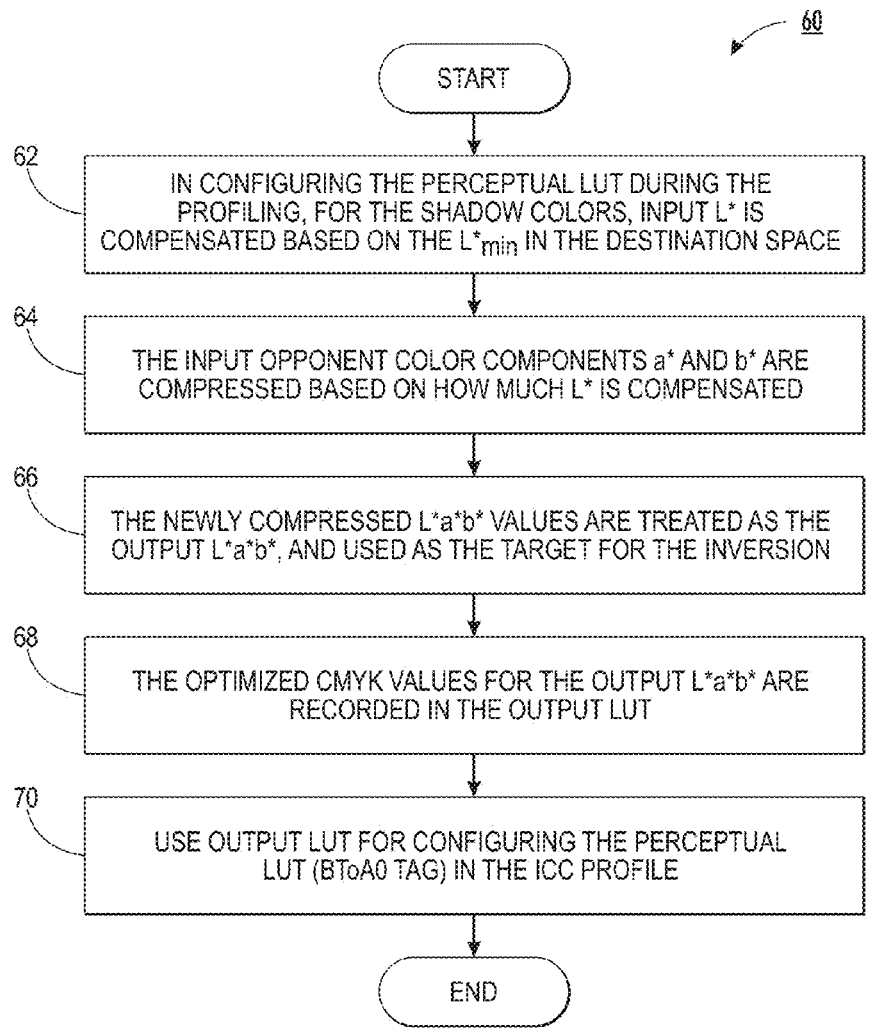
FIG. 5 illustrates a high level flow chart of operations illustrating logical operational steps of a method for color balanced color compression in dynamic range mismatched color systems, in accordance with a preferred embodiment.

FIG. 5 illustrates a high level flow chart of operations illustrating logical operational steps of a method 60 for color balanced color compression in dynamic range mismatched color systems, in accordance with a preferred embodiment. As indicated at the "START" block, the process begins. Thereafter, as shown at block 62, in building the perceptual LUT during the profiling for the shadow colors, input $L^*$ can be compensated based on the $L^*_{min}$ in the destination space. Next, as disclosed at block 64, the input opponent color components $a^*$ and $b^*$ are compressed based on how much $L^*$ is compensated. Then, as described at block 66, the newly compressed $L^*a^*b^*$ values are treated as the output $L^*a^*b^*$ and utilized as the target for the inversion. Next, as described at block 68, the optimized CMYK values for the output $L^*a^*b^*$ can then be recorded in the output LUT, which, as shown next at block 70, can be employed for building the perceptual LUT (BToA0 tag) in the ICC profile. In general, the disclosed embodiments are not limited to applying to the perceptual LUT.

Note that while the disclosed method 60 is generally applied to perceptual rendering intent, or even relative colorimetric applications, method 60 can be also applied to gamut mapping methodology for spot colors. By employing the proposed method 60, the relation between the out of gamut spot colors can be better preserved.

Although example embodiments are discussed herein, the general concept of compressing a* and b* based on the L* compensation, bottom of the printer gamut, and hue location are considered to be included. In general, when there is a mismatch in the dynamic range between source and destination, a* and b* are compressed based on the L* compensation, bottom of the printer gamut, and hue location before gamut mapping. Note that the disclosed embodiments can preserve shadow detail while providing good color balance.

As will be appreciated by one skilled in the art, the disclosed embodiments can be implemented as a method, data-processing system, and/or computer program product, depending upon design considerations and goals. Accordingly, some embodiments may take the form of an entire hardware implementation, an entire software embodiment or embodiments combining software and hardware aspects all generally referred to as a "circuit" or "module." Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network (e.g., WiFi, WiMax, 802.11x, cellular network, etc.) or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein such as, for example, the various instructions shown with respect to particular blocks in of method 60.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6:
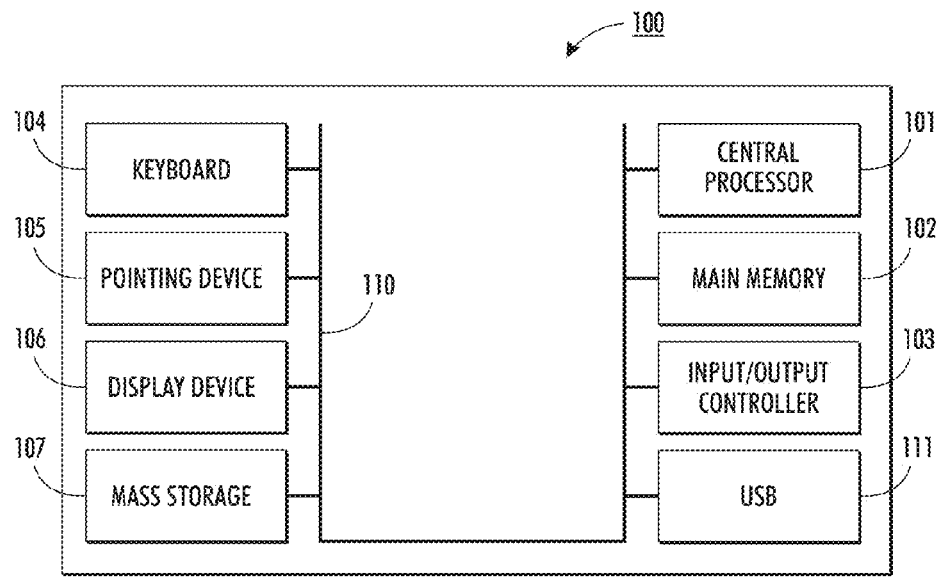
FIG. 6 illustrates a schematic view of a computer system, which can be implemented in accordance with the disclosed embodiments.
Figure 7:
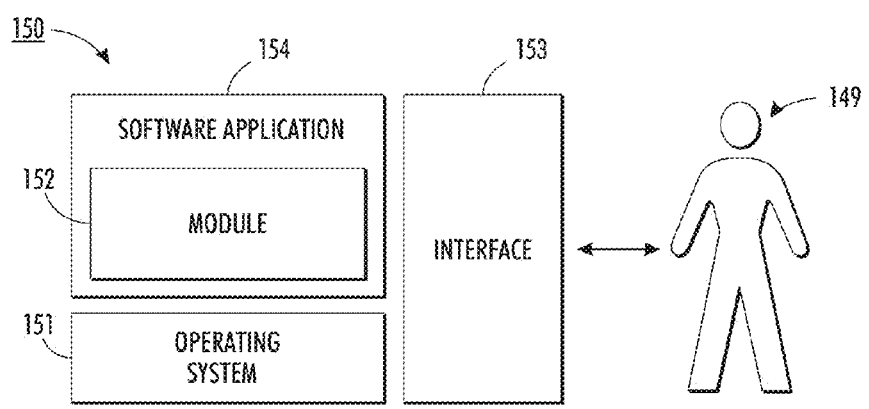
FIG. 7 illustrates a schematic view of a system including a one or more modules, an operating system, and a user interface, in accordance with the disclosed embodiments.

FIGS. 6-7 are provided as exemplary diagrams of data-processing environments in which embodiments of the present invention may be implemented. It should be appreciated that FIG. 6-7 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 6, the disclosed embodiments may be implemented in the context of a data-processing system 100 that includes, for example, a central processor 101 (or other processors), a main memory 102, an input/output controller 103, and in some embodiments, a USB (Universal Serial Bus) 111 or other appropriate peripheral connection. System 100 can also include a keyboard 104, an input device 105 (e.g., a pointing device such as a mouse, track ball, pen device, etc.), a display device 106, and a mass storage 107 (e.g., a hard disk). As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 7 illustrates a computer software system 150, which may be employed for directing the operation of the data-processing system 100 depicted in FIG. 6. Software application 154, stored in main memory 102 and on mass storage 107 shown in FIG. 6, generally includes and/or is associated with a kernel or operating system 151 and a shell or interface 153. One or more application programs, such as module(s) 152, may be "loaded" (i.e., transferred from mass storage 107 into the main memory 102) for execution by the data-processing system 100. The data-processing system 100 can receive user commands and data through user interface 153 accessible by a user 149. These inputs may then be acted upon by the data-processing system 100 in accordance with instructions from operating system 151 and/or software application 154 and any software module(s) 152 thereof.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules (e.g., module 152) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 153 (e.g., a graphical user interface) can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, one or more module(s) 152, which can include instructions for carrying out steps or logical operations such as those shown of method 60 shown in FIG. 5 herein or other similar operations.

FIGS. 6-7 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Based on the foregoing, it can be appreciated that a number of embodiments, preferred and alternative, are disclosed herein. For example, in one embodiment, a method can be implemented for color balanced compression in dynamic range mismatched color environments. Such a method can include the steps or logical operations of compensating input $L^*$ based on $L^*_{min}$ in a destination space with respect to shadow colors while configuring a perceptual LUT during a profile phase; compressing input opponent color components $a^*$ and $b^*$ based on how much $L^*$ is compensated to generate newly compressed $L^*a^*b^*$ values; and treating the newly compressed $L^*a^*b^*$ values as an output $L^*a^*b^*$ to configure the perceptual LUT for color balanced compression thereof.

In another embodiment, a step or logical operation can be provided for recording in an output LUT, optimized CMYK values with respect to the output $L^*a^*b^*$ to configure the perceptual LUT in an ICC profile and result in the color balanced compression thereof. In still another embodiment, a step or logical operation can be implemented for employing the color balanced compression for reducing contouring with respect to an image thereof. In some embodiments, the color balanced compression can apply to perceptual rendering intent. In yet other embodiments, the color balanced compression can apply to relative colormetric applications. In still other embodiments, the color balanced compression can apply to gamut mapping for spot colors. In another embodiment, the color balanced compression can apply to image object rendering. In still other embodiments, the color balanced compression can apply to smooth shading object rendering. In another embodiment, the color balanced compression can apply to a black point compensation algorithm.

In another embodiment, a system for color balanced compression in dynamic range mismatched color environments can be implemented. Such a system can include, for example, a processor, a data bus coupled to the processor, and a computer-usable medium embodying computer program code, the computer-usable medium being coupled to the data bus. The computer program code can include instructions executable by the processor and configured, for example, for compensating input $L^*$ based on $L^*_{min}$ in a destination space with respect to shadow colors while configuring a perceptual LUT during a profile phase; compressing input opponent color components $a^*$ and $b^*$ based on how much $L^*$ is compensated to generate newly compressed $L^*a^*b^*$ values; and treating the newly compressed $L^*a^*b^*$ values as an output $L^*a^*b^*$ to configure the perceptual LUT for color balanced compression thereof.

In another embodiment, such instructions can be further configured for recording in an output LUT, optimized CMYK values with respect to the output $L^*a^*b^*$ to configure the perceptual LUT in an ICC profile and result in the color balanced compression thereof. In yet another embodiment, such instructions can be further configured for employing the color balanced compression for reducing contouring with respect to an image thereof.

In another embodiment, a processor-readable medium storing computer code representing instructions to cause a process color balanced compression in dynamic range mismatched color environments can be implemented. The computer code can include code to, for example, compensate input $L^*$ based on $L^*_{min}$ in a destination space with respect to shadow colors while configuring a perceptual LUT during a profile phase; compress input opponent color components $a^*$ and $b^*$ based on how much $L^*$ is compensated to generate newly compressed $L^*a^*b^*$ values; and treat the newly compressed $L^*a^*b^*$ values as an output $L^*a^*b^*$ to configure the perceptual LUT for color balanced compression thereof. In some embodiments, such code can further comprise code to, for example, record in an output LUT, optimized CMYK values with respect to the output $L^*a^*b^*$ to configure the perceptual LUT in an ICC profile and result in the color balanced compression thereof.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A method for color balanced compression in dynamic range mismatched color environments, said method comprising:

compensating input $L^*$ based on $L^*_{min}$ in a destination space with respect to shadow colors of an image while configuring a perceptual LUT during a profile phase, wherein $L^*$ represents a luminance value and $L^*_{min}$ represents a minimum luminance value in an $L^*a^*b^*$ color space;

compressing input opponent color components $a^*$ and $b^*$ based on how much $L^*$ is compensated to generate newly compressed $L^*a^*b^*$ values for said image to be rendered via a rendering device; and treating said newly compressed $L^*a^*b^*$ values as an output $L^*a^*b^*$ to configure said perceptual LUT for color balanced compression thereof for rendering of said image via said rendering device.

2. The method of claim 1 further comprising recording in an output LUT, optimized CMYK values with respect to said output L*a*b* to configure said perceptual LUT in an ICC profile and result in said color balanced compression thereof with respect to said image rendered via said rendering device.

3. The method of claim 1 further comprising employing said color balanced compression for reducing contouring with respect to said image thereof.

4. The method of claim 1 wherein said color balanced compression applies to perceptual rendering intent.

5. The method of claim 1 wherein said color balanced compression applies to relative colormetric applications.

6. The method of claim 1 wherein said color balanced compression applies to gamut mapping for spot colors.

7. The method of claim 1 wherein said color balanced compression applies to image object rendering via said rendering device.

8. The method of claim 1 wherein said color balanced compression applies to smooth shading object rendering via said rendering device.

9. The method of claim 1 wherein said color balanced compression applies to a black point compensation algorithm.

10. A system for color balanced compression in dynamic range mismatched color environments, said system comprising:
- a processor that communicates electronically with a data rendering device;
- a data bus coupled to said processor; and
- a non-transitory computer-usable medium embodying computer program code, said computer-usable medium being coupled to said data bus, said computer program code comprising instructions executable by said processor and configured for:
  - compensating input $L^*$ based $L^*_{min}$ on in a destination space with respect to shadow colors of an image while configuring a perceptual LUT during a profile phase, wherein $L^*$ represents a luminance value and $L^*_{min}$ represents a minmum luminance value in an $L^*a^*b^*$ color space;
  - compressing input opponent color components a* and b* based on how much L* is compensated to generate newly compressed L*a*b* values for said image to be rendered by said rendering device; and
  - treating said newly compressed L*a*b* values as an output L*a*b* to configure said perceptual LUT for color balanced compression thereof for rendering of said image via said rendering device.

11. The system of claim 10 wherein said instructions are further configured for recording in an output LUT, optimized CMYK values with respect to said output L*a*b* to configure said perceptual LUT in an ICC profile and result in said color balanced compression thereof with respect to said image rendered by said rendering device.

12. The system of claim 10 wherein said instructions are further configured for employing said color balanced compression for reducing contouring with respect to said image rendered via said rendering device.

13. The system of claim 10 wherein said color balanced compression applies to perceptual rendering intent.

14. The system of claim 10 wherein said color balanced compression applies to relative colormetric applications.

15. The system of claim 10 wherein said color balanced compression applies to gamut mapping for spot colors.

16. The system of claim 10 wherein said color balanced compression applies to image object rendering via said rendering device.

17. The system of claim 10 wherein said color balanced compression applies to smooth shading object rendering via said rendering device.

18. The system of claim 10 wherein said color balanced compression applies to a black point compensation algorithm.

19. A non-transitory processor-readable medium storing computer code representing instructions to cause a process color balanced compression in dynamic range mismatched color environments, said computer code comprising code to:
- compensate input $L^*$ based on $L^*_{min}$ in a destination space with respect to shadow colors of an image while configuring a perceptual LUT during a profile phase, wherein $L^*$ represents a luminance value and $L^*_{min}$ represents a minimum luminance value in an $L^*a^*b^*$ color space;
- compress input opponent color components a* and b* based on how much L* is compensated to generate newly compressed L*a*b* values for said image to be rendered via a rendering device; and
- treat said newly compressed L*a*b* values as an output L*a*b* to configure said perceptual LUT for color balanced compression for rendering of said image via said rendering device.

20. The non-transitory processor-readable medium of claim 19 wherein said code further comprises code to record in an output LUT, optimized CMYK values with respect to said output L*a*b* to configure said perceptual LUT in an ICC profile and result in said color balanced compression for rendering of said image via said rendering device.

* * * * *